(12) United States Patent
Park

(10) Patent No.: US 11,107,477 B2
(45) Date of Patent: Aug. 31, 2021

(54) SYSTEM AND METHOD OF PROVIDING CUSTOMIZED CONTENT BY USING SOUND

(71) Applicant: Yoon Jong Park, Bucheon-si (KR)

(72) Inventor: Yoon Jong Park, Bucheon-si (KR)

( * ) Notice: Subject to any disclaimer, the term of this patent is extended or adjusted under 35 U.S.C. 154(b) by 190 days.

(21) Appl. No.: 16/425,201

(22) Filed: May 29, 2019

(65) Prior Publication Data

US 2020/0043500 A1 Feb. 6, 2020

(30) Foreign Application Priority Data

Aug. 3, 2018 (KR) ........................ 10-2018-0090977

(51) Int. Cl.
*G10L 17/00* (2013.01)
*G06F 16/435* (2019.01)
*G10L 17/04* (2013.01)
*G10L 25/90* (2013.01)

(52) U.S. Cl.
CPC ............ *G10L 17/00* (2013.01); *G06F 16/436* (2019.01); *G10L 17/04* (2013.01); *G10L 25/90* (2013.01)

(58) Field of Classification Search
CPC ......... G10L 17/00; G10L 17/04; G10L 15/90; G10L 2015/223; G10L 15/22; G10L 13/00; G10L 15/02; G10L 15/063; G10L 15/16; G10L 15/1585; G10L 15/1822; G10L 15/20; G10L 15/30; G10L 19/26; G10L 2015/0631; G10L 2015/226; G10L 2015/228; G10L 25/18; G10L 25/48; G10L 25/51; G10L 25/84; G06F 3/04817; G06F 3/0482; G06F 3/023; G06F 40/117

USPC ........... 704/10, 257, 270, 270.1, 275, 278, 9
See application file for complete search history.

(56) References Cited

U.S. PATENT DOCUMENTS

| | | | | |
|---|---|---|---|---|
| 5,899,975 A | * | 5/1999 | Nielsen | G10L 13/00 704/270.1 |
| 6,138,100 A | * | 10/2000 | Dutton | G10L 15/1822 704/275 |
| 9,894,402 B2 | * | 2/2018 | Yun | H04N 21/44222 |
| 2014/0006540 A1 | * | 1/2014 | Rao | G09B 19/0092 709/213 |

(Continued)

FOREIGN PATENT DOCUMENTS

JP 6250852 B1 12/2017
KR 10-2014-0035003 A 3/2014

*Primary Examiner* — Vijay B Chawan
(74) *Attorney, Agent, or Firm* — Nelson Mullins Riley & Scarborough LLP; Kongsik Kim, Esq.

(57) ABSTRACT

Disclosed are a system and a method of providing customized content by using a sound, the system including: multiple smart devices outputting content for each channel received from a content provider; multiple user terminals configured to: receive a user's voice for a preset text for voice recognition to register the user's voice as voice data for user identification, and receive waveform data of a sound output from the smart device and voice data of the user for transmission when a voice corresponding to the registered voice data for user identification is recognized while the smart device is in operation; and a recommendation server configured to: collect the waveform data for the content that is possibly output from the smart device, and analyze the voice data and the waveform data to generate interest information of the user when the waveform data and the voice data are transmitted from the user terminal.

16 Claims, 6 Drawing Sheets

(56) References Cited

U.S. PATENT DOCUMENTS

2016/0156957 A1* 6/2016 Yun .................. H04N 21/44204
                                                    725/14
2018/0197533 A1* 7/2018 Lyon ........................ G10L 15/02
2019/0287523 A1* 9/2019 Zhao ........................ G10L 15/08

* cited by examiner

FIG. 5

| Keyword/Emotion | Pleased | Happy | Excited | Annoying | Angry | Nervous | Sad | Bored | Sleepy | Calm | Peaceful | Relaxed |
|---|---|---|---|---|---|---|---|---|---|---|---|---|
| I love you | 1 | 2 | 0.7 | 0.5 | 0 | 0 | 0 | 0 | 0 | 0.1 | 0.9 | 0.5 |

| Pitch (Recording pitch data of predetermined time interval as string data) |
|---|
| 0.4 0.5 0.4 0.5 0.6 0.7 |

| Volume (Storing in same method as pitch) |
|---|
| 0.4 0.5 0.4 0.5 0.6 0.7 |

SYSTEM AND METHOD OF PROVIDING CUSTOMIZED CONTENT BY USING SOUND

CROSS REFERENCE TO RELATED APPLICATION

The present application claims priority to Korean Patent Application No. 10-2018-0090977, filed Aug. 3, 2018, the entire contents of which is incorporated herein for all purposes by this reference.

BACKGROUND OF THE INVENTION

Field of the Invention

The present invention relates to a system and a method of providing customized content by using a sound. More particularly, the present invention relates to a system and a method of providing customized content by using a sound, the system and the method providing customized content to a user through a sound of content which is output from a smart device that the user owns.

Description of the Related Art

As network communications have become common, the amount of information that we face is immeasurable. Generally, in order to use network communications, a user has used a computer, a tablet PC, and the like. Recently, devices providing information over the Internet have diversified.

For example, a television, which merely provided information simply containing video and sound, is capable of two-way communication between a user and a service provider through network communication. In addition to a television, various electronic devices provide a network communication function.

As electronic devices having a network communication function diversify and the amount of information rapidly increases, it is not easy for users, who face such large amounts of information using electronic devices, to search the massive amounts of information for information the users require.

Thus, there have been proposed a number of systems for extracting and recommending information appropriate for a user by identifying a characteristic of the user even if the user does not search for information by himself/herself.

However, most recommendation systems use a method of recommending information according to preference that the user inputs. In the case of this method, a user is required to provide information as required by the system, so the user finds it inconvenient.

As a method to solve the problem that the user needs to input information by himself/herself, there is proposed a method where a particular electronic device analyzes a use history of the user, and the like to recommend information the user requires. However, this is far different from information that the user actually requires, so there have been no efficient recommendation methods proposed.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a system and a method of providing customized content by using a sound, wherein a user is recognized on the basis of the user's voice, and interest information of the user is found out using the user's voice and a sound of content that is in use by the user, thereby providing the customized content.

It is to be understood that technical problems to be solved by the present disclosure are not limited to the aforementioned technical problems and other technical problems which are not mentioned will be apparent from the following description to a person with an ordinary skill in the art to which the present disclosure pertains.

In order to achieve the above object, according to one aspect of the present invention, there is provided a system for providing customized content by using a sound, the system including: multiple smart devices outputting content for each channel received from a content provider; multiple user terminals configured to: receive a voice of a user with respect to a preset text for voice recognition to register the voice of the user as voice data for user identification, and receive waveform data of a sound output from the smart device and voice data of the user for transmission when a voice corresponding to the registered voice data for user identification is recognized while the smart device is in operation; and a recommendation server configured to: periodically collect the waveform data of the sound with respect to the content for each channel that is possibly output from the smart device, and analyze the voice data and the waveform data to generate interest information of the user when the waveform data and the voice data are transmitted from the user terminal.

The recommendation server may specify content by using time information contained in the waveform data received from the user terminal and by using time information contained in waveform information of the collected sound.

Further, the recommendation server may generate the interest information of the user by the specified content.

Further, the smart device may designate, when a voice different from the voice of the user is continuously recognized together with the voice of the user, the recognized voices as speech data for transmission to the recommendation server.

Further, the recommendation server may extract a keyword from the speech data and may analyze pitch and volume of the voice contained in the speech data to analyze a character of the user.

Further, the recommendation server may generate the interest information of the user on the basis of the analyzed character of the user.

Further, the smart device may transmit, when a sound is continuously generated while a starting word by the voice of the user is not input, waveform data of the generated sound to the recommendation server.

Further, the recommendation server may compare the waveform data of the generated sound with a sound that is generated on a preset content provision route so as to apply a result of the comparison in generating the interest information of the user.

Further, the recommendation server recommends, when a recommendation request of the user is input from one among the smart device and the user terminal, the customized content on the basis of the generated interest information of the user.

In the meantime, according to another aspect of the present invention, there is provided a method of providing customized content by using a sound, the method including: periodically collecting, by a recommendation server, waveform data of a sound with respect to content for each channel that is possibly output from multiple smart devices which output the content for each channel received from a content provider; registering, by multiple user terminals after receiving a voice of the user with respect to a preset text for voice recognition, the voice of the user as voice data for user identification; receiving and transmitting, by the multiple user terminals when a voice corresponding to the registered voice data for user identification is recognized while the smart device is in operation, waveform data of a sound output from the smart device and voice data of the user; and generating, by the recommendation server, interest information of the user by analyzing the voice data and the waveform data when the waveform data and the voice data are transmitted from the user terminal.

Further, the method may include specifying, by the recommendation server, content by using time information contained in the waveform data received from the user terminal and by using time information contained in waveform information of the collected sound.

Further, at the generating, the recommendation server may generate the interest information of the user by the specified content.

Further, the method may include designating, by the smart device when a voice different from the voice of the user is continuously recognized together with the voice of the user, the recognized voices as speech data for transmission to the recommendation server.

Further, the method may include extracting, by the recommendation server, a keyword from the speech data and analyzing pitch and volume of the voice contained in the speech data to analyze a character of the user.

Further, at the generating, the recommendation server may generate the interest information of the user on the basis of the analyzed character of the user.

Further, the method may include transmitting, by the smart device when a sound is continuously generated while a starting word by the voice of the user is not input, waveform data of the generated sound to the recommendation server.

Further, at the generating, the recommendation server may compare the waveform data of the generated sound with a sound that is generated on a preset content provision route so as to apply a result of the comparison in generating the interest information of the user.

Further, the method may include recommending, by the recommendation server when a recommendation request of the user is input from one among the smart device and the user terminal, the customized content on the basis of the generated interest information of the user.

According to the present invention, it is possible to provide a system and a method of providing customized content by using a sound, wherein customized content to which a character of the user is applied is provided through an analysis of a sound generated by a smart device that the user uses and of a voice in speech of the user.

Effects that may be obtained from the present invention will not be limited to only the above described effects. In addition, other effects which are not described herein will become apparent to those skilled in the art from the following description.

BRIEF DESCRIPTION OF THE DRAWINGS

The above and other objects, features and other advantages of the present invention will be more clearly understood from the following detailed description when taken in conjunction with the accompanying drawings, in which:

FIG. 5 is a diagram illustrating a method of analyzing user's voice for a character of a user according to an exemplary embodiment of the present invention.

DETAILED DESCRIPTION OF THE INVENTION

Figure 1:
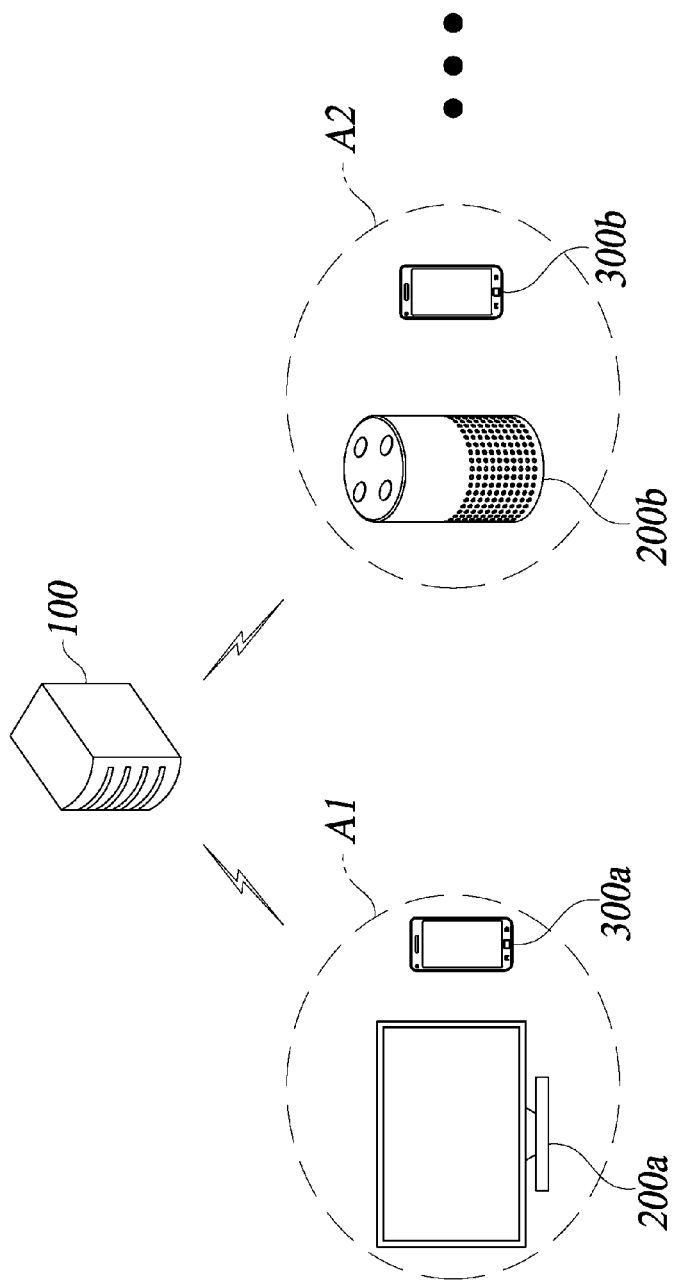
FIG. 1 is a diagram illustrating a configuration of a network for a system for providing customized content by using a sound according to an exemplary embodiment of the present invention.

The above-described objects, other objects, features, and advantages of the present invention will be apparent from the following description of exemplary embodiments with reference to the accompanying drawings. However, the present invention is not limited to exemplary embodiments described herein and may be embodied in various forms. The embodiments described herein are provided so that this disclosure will be thorough and complete and will fully convey the idea of the present invention to those skilled in the art.

In this specification, when an element is referred to as being on another element, it may be directly formed on another element, or a third element may be interposed therebetween. In the drawings, the thicknesses of the elements are exaggerated for effective description of the technical details.

When teams used in the specification, "first", "second", etc. are used to describe elements, the elements should not be limited by these terms. These terms have only been used to distinguish one element from another. The embodiments described and exemplified herein include their complementary embodiments.

Also, when it is described that a first element (or constituent) operates or runs on a second element (or constituent), it should be understood that the first element (or constituent) operates or runs in an environment where the second element (or constituent) operates or runs, or the first element (or constituent) operates or runs through direct or indirection interaction with the second element (or constituent).

When it is described that an element, a constituent, an apparatus, or a system includes a constituent configured by a program or software, regardless of explicit mentioning, it should be understood that the element, the constituent, the apparatus, or the system includes another type of hardware (for example, a memory, a CPU, and the like), a program or software (for example, a driver, and the like required to run an operating system or hardware) that are necessary for the program or software to run or operate.

Also, in implementing an element (or a constituent), unless otherwise specially described, it should be understood that the element (or the constituent) may be implemented in any form of software, hardware, or a combination thereof.

Also, the terms used herein are provided to describe the embodiments but not to limit the present invention. In the specification, the singular forms include plural forms unless particularly mentioned. The terms "comprises" and/or "comprising" used herein specify the presence of stated elements, but do not preclude the presence or addition of one or more other elements.

FIG. 1 is a diagram illustrating a configuration of a network for a system for providing customized content by using a sound according to an exemplary embodiment of the present invention.

Referring to FIG. 1, a system for providing customized content by using a sound according to an exemplary embodiment of the present invention includes a recommendation server 100 and multiple user-owned devices that connect thereto over a wired/wireless network.

The recommendation server 100 is a server that provides customized content to users who access the server via various smart devices over a wired/wireless network. To this end, the recommendation server 100 periodically collects waveform data of a sound with respect to content for each channel that may be periodically output from the smart device on the user side. The recommendation server 100 will be described below in detail with reference to FIG. 2.

The user-owned devices mean devices, namely, a smart device and a user terminal, which are positioned within a particular place. As shown in the figure, it is illustrated that a smart TV 200a and a smartphone 300a are provided in a first place A1 and an artificial intelligence (AI) speaker 200b and a smartphone 300b are provided in a second place A2. The first place A1 and the second place A2 may be a general private house or a limited place, such as an office or a business place.

The user who has subscribed to the recommendation server 100 as a member for using a service has at least two user-owned devices. As shown in the figure, the user has one of content output devices, such as the smart TV 200a and the AI speaker 200b, and has a user terminal such as the smartphones 300a and 300b.

The smart device outputs content for each channel received from a content provider, and examples of the smart device include the smart TV 200a, the AI speaker 200b, and the like. The content provider may be a cable TV operator. The smart device will be described below in detail with reference to FIG. 3.

In this embodiment, it is exemplified that one user has at least two user-owned devices. However, no limitation to this is imposed. For example, when all the functions of the smart device and the user terminal are implemented by one smart integrated device, a case where one user has one smart integrated device is possible.

The user terminal receives the user's voice to register voice data for user identification. When the user's voice is recognized, the user terminal receives waveform data of a sound output from the smart device and voice data of the user for transmission to the recommendation server 100. The user terminal will be described below in detail with reference to FIG. 4.

Figure 2:
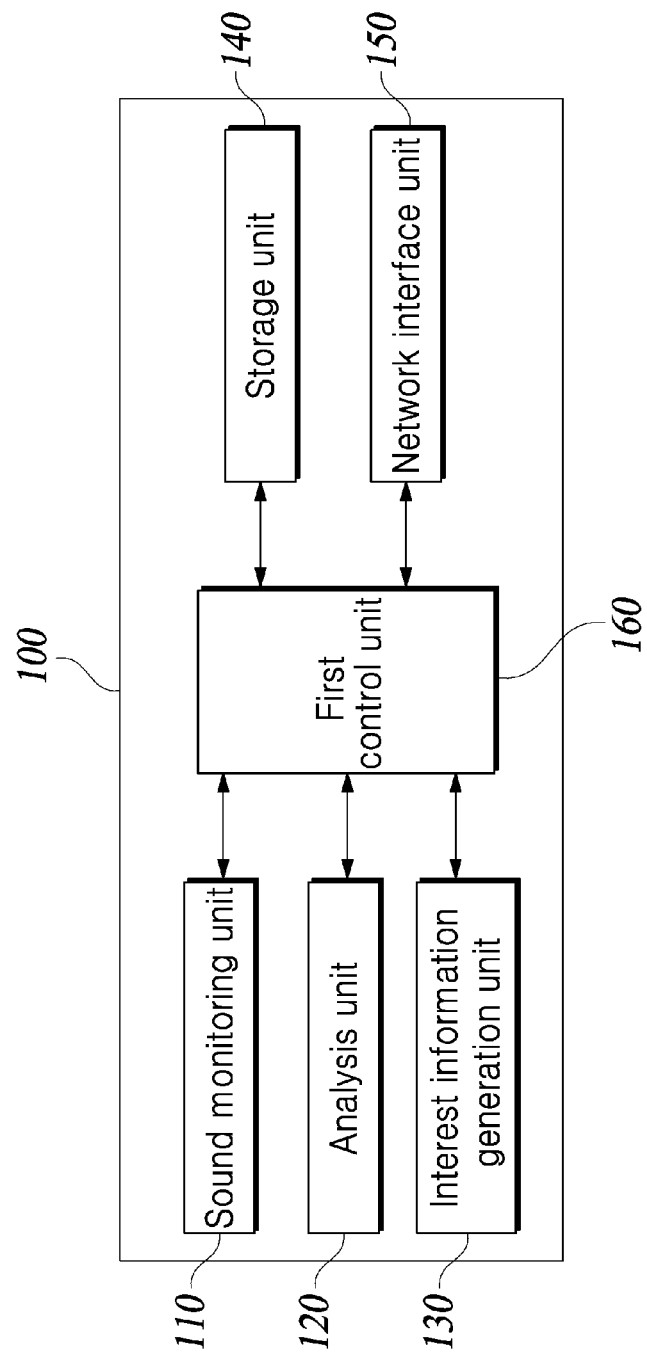
FIG. 2 is a block diagram illustrating a recommendation server according to an exemplary embodiment of the present invention.

FIG. 2 is a block diagram illustrating a recommendation server according to an exemplary embodiment of the present invention.

Referring to FIG. 2, the recommendation server 100 according to the exemplary embodiment of the present invention includes a sound monitoring unit 110, an analysis unit 120, and interest information generation unit 130, a storage unit 140, a network interface unit 150, and a first control unit 160.

The sound monitoring unit 110 periodically monitors content for each channel which may be output from the smart device to periodically collect waveform data of a sound generated from the content. The channels monitored by the sound monitoring unit 110 may include all channels by various cable TV operators.

The sound monitoring unit 110 may measure a viewing time of the current channel at the point in time when a change of the channel of the smart device 200 is detected. Here, the change of the channel may be determined when rapid change in frequency waveform is detected, or the change of the channel may be determined as a result of waveform comparison.

More specifically, the sound monitoring unit 110 starts measuring the viewing time of the current channel at the point in time when the change of the channel is detected, terminates the measuring of the viewing time of the current channel at the point in time when the change of the channel is detected again, and measures the viewing time of the subsequent channel. With this operation, the user is able to be aware of content information of the channel and how much the content has been viewed.

When the analysis unit 120 receives the waveform data of the sound and the voice data of the user from the user terminal, the received waveform data and the received voice data are analyzed. Further, when the analysis unit 120 receives speech data from the user terminal, the analysis unit 120 extracts a keyword from the speech data and analyzes pitch and volume contained in the speech data to analyze a character of the user.

Further, the analysis unit 120 may specify content by using time information that is contained in the waveforms data of the sound received from the user terminal and by using time information that is contained in waveform information of the sound collected by the sound monitoring unit 110.

The interest information generation unit 130 generates interest information according to the result of the analysis by the analysis unit 120. More specifically, the interest information generation unit 130 generates the interest information on what the user likes, what the user enjoys viewing, and the like for each user by applying the character of the user which is analyzed by the analysis unit 120.

The storage unit 140 stores every type of information required for the operation of the recommendation server 100. That is, the storage unit 140 may store personal information on users, and may store information required for the analysis of the sound by the analysis unit 120 and information required for generating the interest information by the interest information generation unit 130.

The network interface unit 150 supports a network interface of the recommendation server 100. The recommendation server 100 is connected to the smart device and the user terminal through a network via the network interface unit 150 to transmit and receive information.

The first control unit 160 controls the entire operation of the recommendation server 100. That is, the first control unit 160 controls signal input and output between the sound monitoring unit 110, the analysis unit 120, the interest information generation unit 130, the storage unit 140, and the network interface unit 150.

Figure 3:
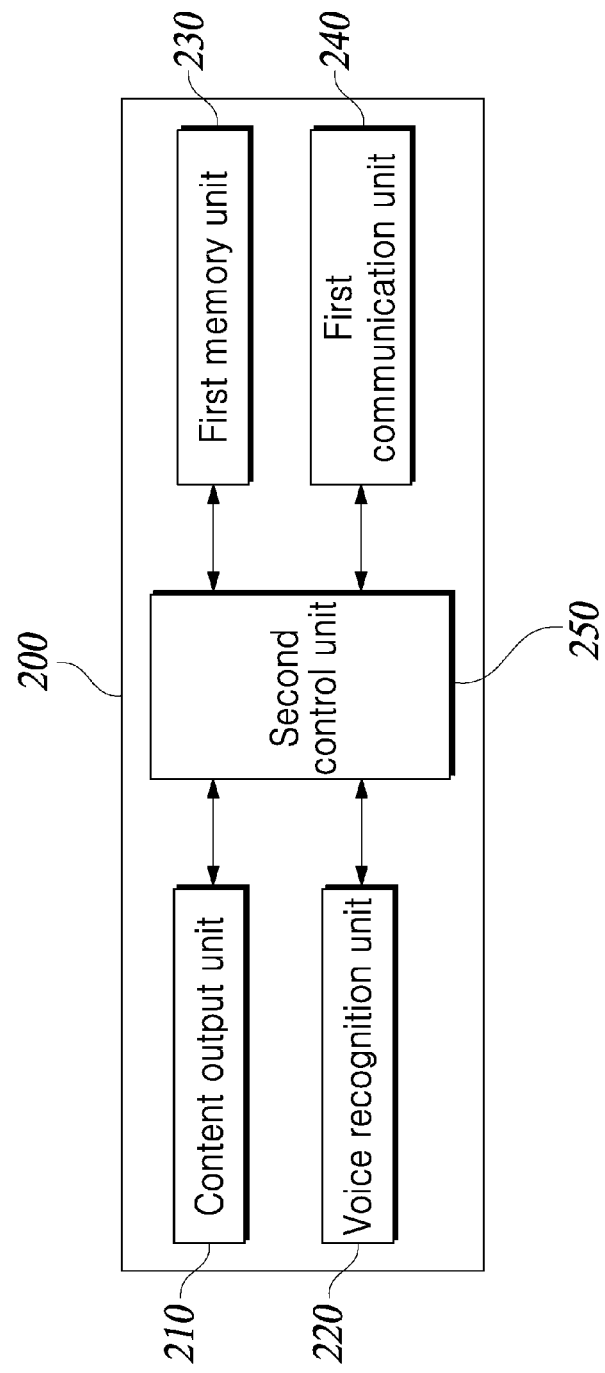
FIG. 3 is a block diagram illustrating a smart device according to an exemplary embodiment of the present invention.

FIG. 3 is a block diagram illustrating a smart device according to an exemplary embodiment of the present invention.

Referring to FIG. 3, the smart device 200 according to the exemplary embodiment of the present invention includes a content output unit 210, a voice recognition unit 220, a first memory unit 230, a first communication unit 240, and a second control unit 250.

The content output unit 210 outputs content for each channel received from the content provider. When the smart device 200 is the smart TV 200a, a set-top box (not shown) is further included according to the supply state of the device. In this case, content for each channel received through the set-top box is provided to the user by outputting an image signal and an audio signal from the smart TV 200a.

The voice recognition unit 220 recognizes the user's voice when the user desires, in using the smart device 200, to control the operation by the user's voice without by a remote control and a button which is a typical method. In order to operate the smart device 200 with a voice, a starting word may be used. In general, a designated phrase, such as "hi, Bixby", "Genie", and "hey, Google", related to the name of each product is referred to as the starting word. When the starting word is recognized through the voice recognition unit 220, receiving user's voice is prepared.

The first memory unit 230 stores every type of information required for the operation of the smart device 200. Channel information for operation of the content output unit 210 may be stored, and the starting word and information for recognizing the voice may be stored for the operation of the voice recognition unit 220.

The first communication unit 240 may perform communication between the smart device 200 and the user terminal 300. In general, the smart device 200 is installed in a particular place for use, so when a mobile user terminal 300 is positioned in a particular place, it is possible to communicate with each other over a local area network.

The second control unit 250 controls overall operation of the smart device 200. That is, the second control unit 250 controls signal input and output between the content output unit 210, the voice recognition unit 220, the first memory unit 230, and the first communication unit 240.

Figure 4:
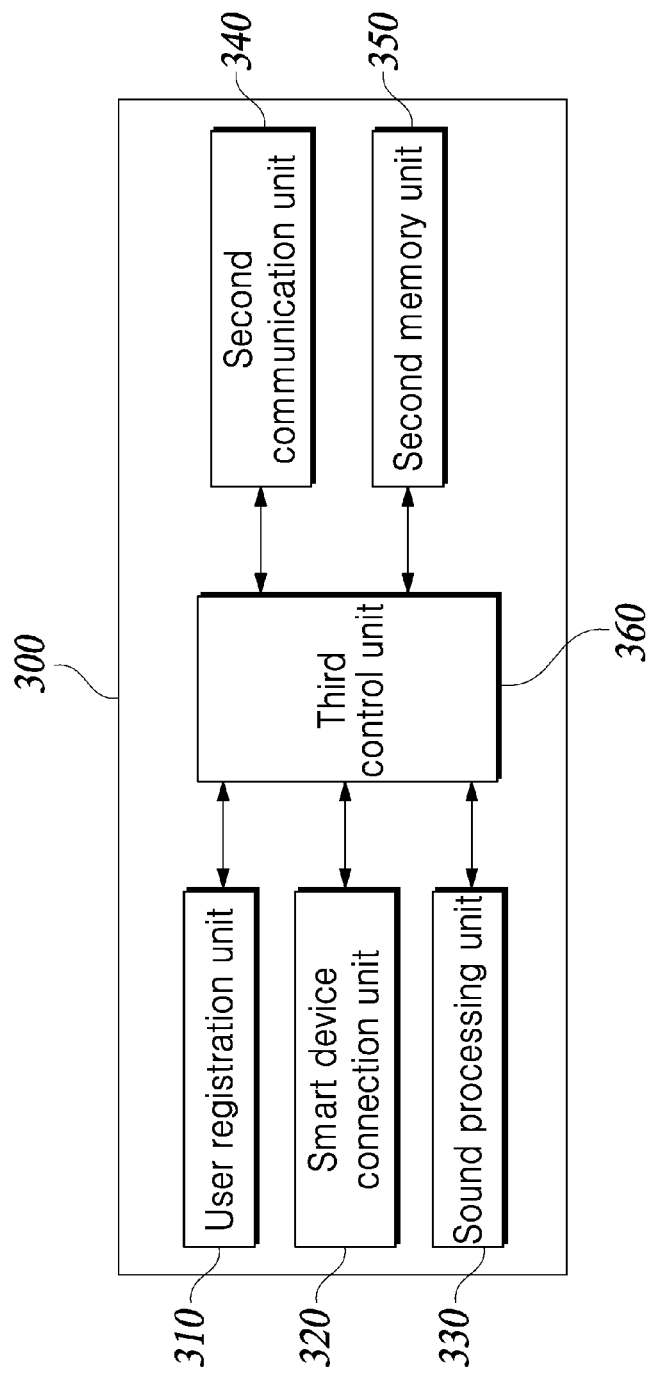
FIG. 4 is a block diagram illustrating a user terminal according to an exemplary embodiment of the present invention.

FIG. 4 is a block diagram illustrating a user terminal according to an exemplary embodiment of the present invention.

Referring to FIG. 4, the user terminal according to the exemplary embodiment of the present invention includes a user registration unit 310, a smart device connection unit 320, a sound processing unit 330, a second communication unit 340, a second memory unit 350, and a third control unit 360.

The user registration unit 310 receives the user's voice with respect to a preset text for voice recognition, for registration as voice data for user identification. Here, the text for voice recognition is a pre-designated text that makes easy to recognize the user's voice. For example, various texts such as "hello, friend", "I love you", "show me the movie" may be used.

Further, in order to receive the user's voice accurately, the user registration unit 310 makes the user to repeatedly input one text for voice recognition or to input two or more texts for voice recognition in sequence.

The smart device connection unit 320 controls a connection operation between the user terminal 300 and the smart device 200 and checks whether the smart device 200 is in operation or not.

When the user's registered voice is recognized by the user registration unit 310, the sound processing unit 330 receives the waveform data of the sound output from the smart device 200 and the voice data of the user.

The second communication unit 340 supports a network interface of the user terminal 300. In this embodiment, the second communication unit 340 supports short-range communication between the user terminal 300 and the smart device 200 and supports network communication between the user terminal 300 and the recommendation server 100.

The second memory unit 350 stores every type of information required for the operation of the user terminal 300. For example, the second memory unit 350 stores the voice data for user identification so that the user terminal 300 recognizes the user.

The third control unit 360 controls overall operation of the user terminal 300. That is, the third control unit 360 controls signal input and output between the user registration unit 310, the smart device connection unit 320, the sound processing unit 330, the second communication unit 340, and the second memory unit 350.

FIG. 5 is a diagram illustrating a method of analyzing user's voice for a character of the user according to an exemplary embodiment of the present invention.

The recommendation server 100 analyzes the voice data of the user and the waveform data of the sound. Further, the recommendation server 100 extracts a keyword from the speech data received from the user terminal 300, and analyzes pitch and volume of the voice contained in the speech data to analyze a character of the user. Thus, the interest information generation unit 130 generates the interest information of the user on the basis of the result of the analysis by the analysis unit 120.

For this operation, in this embodiment, Thayer's emotion model that has merits such as emotion distribution, clarity of a boundary between emotions, ease of expressing an emotion position is used to classify a personality type according to the text.

The analysis unit 120 classifies the emotion according to the keyword in the user's speech while having emotion classification data according to the keyword, and also analyzes information on pitch height, volume of the user.

As shown in the figure, with respect to the keyword "I love you", a quantified state according to items "Pleased", "Happy", "Excited", "Annoying", "Angry", "Nervous", "Sad", "Bored", "Sleepy", "Calm", "Peaceful", and "Relaxed" may be known.

Figure 6:
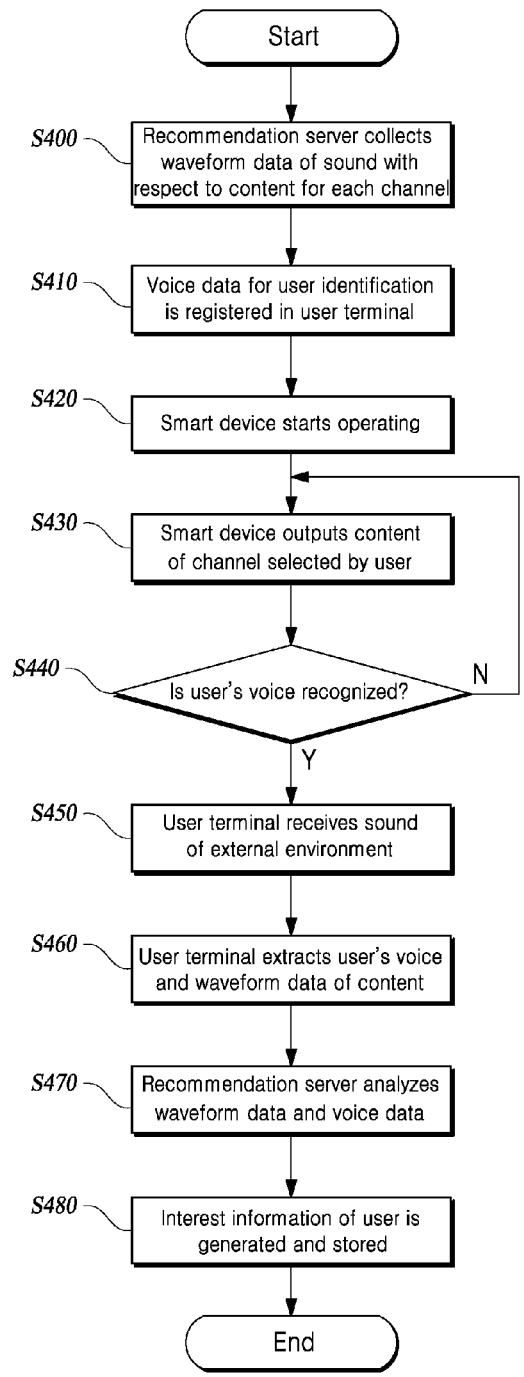
FIG. 6 is a flowchart illustrating a method of providing customized content by using a sound according to an exemplary embodiment of the present invention.

FIG. 6 is a flowchart illustrating a method of providing customized content by using a sound according to an exemplary embodiment of the present invention.

Hereinafter, with reference to FIGS. 1 to 6, a method of providing customized content by using a sound according to an exemplary embodiment of the present invention will be described.

The sound monitoring unit 110 of the recommendation server 100 periodically collects waveform data of a sound with respect to content for each channel at step S400. Thus, the recommendation server 100 always retains the waveform data of the sound with respect to the content for each channel.

The user registers his/her voice using the user terminal 300. More specifically, the user performs an operation of reading aloud a preset text for voice recognition which is provided by the user terminal 300, and the user registration unit 310 receives the user's voice to register the same as voice data for user identification at step S410.

When the user uses a remote control or says a predetermined starting word to operate the smart device 200, the smart device 200 starts operating at step S420, and the smart device 200 outputs the content of the channel selected by the user at step S430. With this operation, communication between the smart device 200 and the user terminal 300 may be connected.

The user terminal 300 may check the operation state of the smart device through the smart device connection unit 320. Thus, while the smart device 200 is in operation, when the pre-registered user's voice is recognized at step S440-Y, the user terminal 300 receives a sound of the external environment at step S450. Here, the sound of the external environment includes the waveform data of the sound output from the smart device 200 and the voice data of the user.

The sound processing unit 330 extracts, from the sound of the external environment, the voice data of the user and the waveform data of the sound of the content output from the smart device 200 at step S460.

The user terminal 300 transmits the extracted waveform data of the sound and the extracted voice data to the recommendation server 100 through the second communication unit 340, and the analysis unit 120 of the recommendation server 100 analyzes the waveforms data and the voice data at step S470. The method of analyzing the voice data is as described above with reference to FIG. 5.

On the basis of the result of the analysis by the analysis unit 120, the interest information generation unit 130 generates the interest information and stores the same in the storage unit 140. Afterward, when there is a request of the user, customized content is provided to the user on the basis of the pre-stored interest information.

With this operation, through the smart TV 200a, the AI speaker 200b, and the smartphones 300a and 300b the user owns, customized content to which the character of the user is applied may be provided by general action such as viewing a favorite channel.

For example, when the user is viewing a TV, waveform of a sound with respect to the content of the channel which the user is viewing is analyzed to find out information on the channel. When it is determined that the user is viewing a home shopping channel and when the speech "pretty" or "I want it" in user's voice is recognized while still viewing the same channel, the character of the user is analyzed through the product being broadcast on the current channel.

Further, when the user inputs a request that "recommend an emoticon" to the smart device 200 or the user terminal 300, a system that an appropriate emoticon is selected among multiple emoticons for recommendation on the basis of the interest information, which is previously determined by the recommendation server 100, is possible rather than that an emoticon is recommended randomly.

As described above, in the method of providing customized content by using a sound according to the embodiment, it is possible to determine and analyze a character of the user by simple action using the smart device 200 that the user owns so as to generate interest information, thereby providing customized content to the user. The provision of this customized content is not limited to a particular product but may be variously applied.

It will be understood by those skilled in the art that the present invention can be embodied in other specific forms without changing the technical idea or essential characteristics of the present invention. Therefore, it should be understood that the embodiments described above are illustrative in all aspects as and not restrictive. The scope of the present invention is characterized by the appended claims rather than the detailed description described above, and it should be construed that all alterations or modifications derived from the meaning and scope of the appended claims and the equivalents thereof fall within the scope of the present invention.

What is claimed is:

1. A system for providing customized content by using a sound, the system comprising:
   one or more smart device configured for outputting content for each channel received from a content provider;
   one or more user terminal configured to: receive waveform data of a sound of the content being output from the smart device and voice data of a user for transmission in response to a voice corresponding to registered voice data for user identification being recognized while the smart device is in operation, wherein the registered voice data has been pre-registered with respect to a preset text; and
   a recommendation server configured to: periodically collect the waveform data of the sound with respect to the content for each channel that is possibly output from the smart device, and analyze the voice data and the waveform data to generate interest information of the user when the waveform data and the voice data are transmitted from the user terminal,
   wherein the recommendation server generates the interest information of the user based on the content that is output from the smart device, and
   wherein the content that is output from the smart device is specified by comparing the waveform data that is transmitted to the recommendation server from the user terminal and the waveform data that is periodically collected by the recommendation server.

2. The system of claim 1, wherein, in specifying the content that is output from the smart device, the recommendation server further uses time information contained in the waveform data received from the user terminal and information contained in the waveform data collected by the recommendation server.

3. The system of claim 1, wherein the smart device designates, when a voice different from the voice of the user is continuously recognized together with the voice of the user, the recognized voices as speech data for transmission to the recommendation server.

4. The system of claim 3, wherein the recommendation server extracts a keyword from the speech data and analyzes pitch and volume of the voice contained in the speech data to analyze a character of the user.

5. The system of claim 4, wherein the recommendation server generates the interest information of the user on the basis of the analyzed character of the user.

6. The system of claim 1, wherein the smart device transmits, when a sound is continuously generated while a starting word by the voice of the user is not input, waveform data of the generated sound to the recommendation server.

7. The system of claim 6, wherein the recommendation server compares the waveform data of the generated sound with a sound that is generated on a preset content provision route so as to apply a result of the comparison in generating the interest information of the user.

8. The system of claim 1, wherein the recommendation server recommends, when a recommendation request of the user is input from one among the smart device and the user terminal, the customized content on the basis of the generated interest information of the user.

9. A method of providing customized content by using a sound, the method comprising:
   periodically collecting, by a recommendation server, waveform data of a sound with respect to content for each channel that is possibly output from one or more smart device which outputs the content for each channel received from a content provider;

registering, by one or more user terminal after receiving a voice of a user with respect to a preset text for voice recognition, the voice of the user as voice data for user identification;

receiving and transmitting, by the user terminal when a voice corresponding to the registered voice data for user identification is recognized while the smart device is in operation, waveform data of a sound of the content being output from the smart device and voice data of the user; and generating, by the recommendation server, interest information of the user when the waveform data and the voice data are transmitted from the user terminal wherein the recommendation server generates the interest information of the user based on the content that is output from the smart device, and wherein the content that is output from the smart device is specified by comparing the waveform data that is transmitted to the recommendation server from the user terminal and the waveform data that is periodically collected by the recommendation server.

10. The method of claim 9, wherein in specifying the content that is output from the smart device, the recommendation server, further uses time information contained in the waveform data received from the user terminal and time information contained in the waveform data collected by the recommendation server.

11. The method of claim 9, further comprising:

designating, by the smart device when a voice different from the voice of the user is continuously recognized together with the voice of the user, the recognized voices as speech data for transmission to the recommendation server.

12. The method of claim 11, further comprising:

extracting, by the recommendation server, a keyword from the speech data and analyzing pitch and volume of the voice contained in the speech data to analyze a character of the user.

13. The method of claim 12, wherein at the generating, the recommendation server generates the interest information of the user on the basis of the analyzed character of the user.

14. The method of claim 9, further comprising:

transmitting, by the smart device when a sound is continuously generated while a starting word by the voice of the user is not input, waveform data of the generated sound to the recommendation server.

15. The method of claim 14, wherein at the generating, the recommendation server compares the waveform data of the generated sound with a sound that is generated on a preset content provision route so as to apply a result of the comparison in generating the interest information of the user.

16. The method of claim 9, further comprising:

recommending, by the recommendation server when a recommendation request of the user is input from one among the smart device and the user terminal, the customized content on the basis of the generated interest information of the user.

* * * * *